United States Patent
Castillo-Effen et al.

(10) Patent No.: US 10,249,197 B2
(45) Date of Patent: Apr. 2, 2019

(54) METHOD AND SYSTEM FOR MISSION PLANNING VIA FORMAL VERIFICATION AND SUPERVISORY CONTROLLER SYNTHESIS

(71) Applicant: General Electric Company, Schenectady, NY (US)

(72) Inventors: Mauricio Castillo-Effen, Rexford, NY (US); Timothy Lee Johnson, Niskayuna, NY (US); Michael Richard Durling, Gansevoort, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/082,885

(22) Filed: Mar. 28, 2016

(65) Prior Publication Data
US 2017/0277203 A1 Sep. 28, 2017

(51) Int. Cl.
*B64C 39/02* (2006.01)
*G08G 5/00* (2006.01)
*G06Q 10/06* (2012.01)

(52) U.S. Cl.
CPC ......... *G08G 5/0039* (2013.01); *B64C 39/024* (2013.01); *G06Q 10/06* (2013.01)

(58) Field of Classification Search
CPC ..... G05D 1/104; B64C 39/024; G08G 5/0039
See application file for complete search history.

(56) References Cited

U.S. PATENT DOCUMENTS

| 5,504,686 A | 4/1996 | Lippitt et al. |
| 5,850,617 A | 12/1998 | Libby |
| 6,430,505 B1 | 8/2002 | Green |
| 6,672,534 B2 | 1/2004 | Harding et al. |

(Continued)

FOREIGN PATENT DOCUMENTS

| EP | 0655699 A1 | 5/1995 |
| EP | 2388669 A2 | 11/2011 |

(Continued)

OTHER PUBLICATIONS

Shakernia et al., "Semi-decidable Synthesis for Triangular Hybrid Systems", Hybrid Systems: Computation and Control, Volume No. 2034 of the series Lecture Notes in Computer Science, pp. 487-500, Mar. 21, 2001.

(Continued)

*Primary Examiner* — Behrang Badii
*Assistant Examiner* — Daniel L Greene
(74) *Attorney, Agent, or Firm* — GE Global Patent Operation; Nitin Joshi

(57) ABSTRACT

A system, medium, and method, including receiving a set of formalized requirements for accomplishing a mission; allocating, by the processor using architecture synthesis, constraint solving, and compositional verification techniques, a role to each of a plurality of assets comprising a team of autonomous entities, the team to execute specific tasks according to their role to accomplish the mission; and generating, by the processor using controller synthesis and verification techniques, automata for accomplishing the mission for the plurality of assets, the automata being encoded to confer an ability to dynamically react to external inputs during a run-time execution of the automata by the plurality of assets.

22 Claims, 4 Drawing Sheets

(56) References Cited

U.S. PATENT DOCUMENTS

| | | |
|---|---|---|
| 6,937,968 B1 | 8/2005 | Carrico et al. |
| 6,997,097 B2 | 2/2006 | Harding |
| 7,162,199 B1 | 1/2007 | Glickstein et al. |
| 7,248,952 B2 | 7/2007 | Ma et al. |
| 7,415,331 B2 | 8/2008 | Dapp et al. |
| 7,451,023 B2 | 11/2008 | Appleby et al. |
| 7,765,038 B2 | 7/2010 | Appleby et al. |
| 8,078,319 B2 | 12/2011 | Franke et al. |
| 8,355,834 B2 | 1/2013 | Duggan et al. |
| 8,566,027 B2 | 10/2013 | Rosswog et al. |
| 8,620,510 B1 | 12/2013 | Meuth et al. |
| 8,626,540 B2 | 1/2014 | Peterkofsky et al. |
| 8,634,982 B2 | 1/2014 | Khosla et al. |
| 8,644,512 B2 | 2/2014 | Khazan et al. |
| 8,788,121 B2 | 7/2014 | Klinger |
| 2002/0169658 A1* | 11/2002 | Adler ............... G06Q 10/06 705/7.28 |
| 2003/0120620 A1* | 6/2003 | Fromherz ........... G06N 5/003 706/45 |
| 2004/0162638 A1* | 8/2004 | Solomon ........... G05D 1/0088 700/247 |
| 2005/0004723 A1* | 1/2005 | Duggan ............ G05D 1/0061 701/24 |
| 2007/0021879 A1* | 1/2007 | DelNero ........... G05D 1/0088 701/23 |
| 2007/0021880 A1* | 1/2007 | Appleby ........... G05D 1/0088 701/23 |
| 2007/0067145 A1 | 3/2007 | Miller et al. |
| 2007/0299711 A1 | 12/2007 | Lundberg |
| 2008/0027769 A1 | 1/2008 | Eder |
| 2009/0157236 A1 | 6/2009 | Van Gaasbeck et al. |
| 2010/0023185 A1 | 1/2010 | Terwelp et al. |
| 2011/0029804 A1 | 2/2011 | Hadden et al. |
| 2011/0087515 A1 | 4/2011 | Miller et al. |
| 2011/0256511 A1 | 10/2011 | Cragg |
| 2011/0271822 A1 | 11/2011 | Myr |
| 2011/0295501 A1 | 12/2011 | Gutierez-Castaneda |
| 2012/0158219 A1 | 6/2012 | Durling et al. |
| 2014/0018979 A1 | 1/2014 | Goossen et al. |
| 2014/0025228 A1 | 1/2014 | Jang et al. |
| 2014/0156109 A1 | 6/2014 | Estkowski |
| 2014/0214469 A1* | 7/2014 | Callow ............ G06Q 10/00 705/7.15 |
| 2015/0025713 A1 | 1/2015 | Klinger et al. |
| 2015/0332523 A1* | 11/2015 | Ranasinghe ........ H04W 24/10 701/34.2 |
| 2015/0370252 A1* | 12/2015 | Hanson .............. B60F 5/00 701/2 |
| 2017/0212511 A1* | 7/2017 | Paiva Ferreira ....... G06Q 10/08 |

FOREIGN PATENT DOCUMENTS

| | | |
|---|---|---|
| EP | 2688016 A1 | 1/2014 |
| KR | 20150000053 A | 1/2015 |
| KR | 101510745 B1 | 4/2015 |
| WO | 2012/125600 A1 | 9/2012 |
| WO | 2013/140401 A2 | 9/2013 |

OTHER PUBLICATIONS

Topsakal, "Robust Motion Planning in Presence of Uncertainties Using a Maneuver Automaton", Master's Thesis, Georgia Institute of Technology, pp. 1-105, Apr. 2005.

Frazzoli et al., "Maneuver-Based Motion Planning for Nonlinear Systems With Symmetries", IEEE Transactions on Robotics, Volume No. 21, Issue No. 6, pp. 1077-1091, Dec. 2005.

Belta et al., "Symbolic Planning and Control of Robot Motion", IEEE Robotics & Automation Magazine, Volume No. 14, pp. 61-70, Mar. 2007.

Bhatia et al., "Motion planning with complex goals", IEEE Robotics & Automation Magazine, Volume No. 18, pp. 55-64, Sep. 13, 2011.

Hinchman et al., "Towards Safety Assurance of Trusted Autonomy in Air Force Flight Critical Systems", Annual Computer Security Applications Conference, pp. 6, 2012.

Clark et al., "A Study on Run Time Assurance for Complex Cyber Physical Systems", Technical Report, Air Force Research Lab Wright-Patterson AFB OH Aerospace Systems DIR, pp. 79, Apr. 18, 2013.

Tamura et al., "Towards Practical Runtime Verification and Validation of Self-Adaptive Software Systems", Software Engineering for Self-Adaptive Systems II, Lecture Notes in Computer Science, Volume No. 7475, pp. 108-132, 2013.

Lin, "Mission Accomplished: An Introduction to Formal Methods in Mobile Robot Motion Planning and Control", Unmanned Systems, Volume No. 2, Issue No. 2, pp. 201-216, Apr. 21, 2014.

* cited by examiner

300

```
┌─────────────────────────────────────────────┐
│                                             │
│       RECEIVE A SET OF FORMALIZED           │
│   REQUIREMENTS FOR ACCOMPLISHING A MISSION  │
│                                             │
│                                       305   │
└─────────────────────────────────────────────┘
                      │
                      ▼
┌─────────────────────────────────────────────┐
│   ALLOCATE, USING ARCHITECTURE SYNTHESIS    │
│   AND CONSTRAINT SOLVING TECHNIQUES, A ROLE │
│   TO EACH OF A PLURALITY OF ASSETS COMPRISING│
│    A TEAM OF AUTONOMOUS ENTITIES, THE TEAM  │
│     TO EXECUTE SPECIFIC TASKS ACCORDING TO  │
│      THEIR ROLE TO ACCOMPLISH THE MISSION   │
│                                       310   │
└─────────────────────────────────────────────┘
                      │
                      ▼
┌─────────────────────────────────────────────┐
│   GENERATE, BY THE PROCESSOR USING CONTROLLER│
│        SYNTHESIS TECHNIQUES, AUTOMATA FOR   │
│    ACCOMPLISHING THE MISSION FOR THE PLURALITY OF│
│     ASSETS, THE AUTOMATA BEING ENCODED TO CONFER│
│     AN ABILITY TO DYNAMICALLY REACT TO EXTERNAL│
│      INPUTS DURING A RUN-TIME EXECUTION OF THE│
│       AUTOMATA BY THE PLURALITY OF ASSETS   │
│                                       315   │
└─────────────────────────────────────────────┘
```

*FIG. 3*

METHOD AND SYSTEM FOR MISSION PLANNING VIA FORMAL VERIFICATION AND SUPERVISORY CONTROLLER SYNTHESIS

BACKGROUND

Planning and re-planning missions for a team of heterogeneous autonomous assets presents a complex challenge. The challenge is complicated, at least in part, by the fact that while the assets are autonomous they must coordinate at least some of their actions in order to accomplish a mission. Additionally, people may be reluctant to trust a mission planning system or platform that automatically generates mission plans that are not fully scripted. However, many real-world missions that could benefit by improved mission planning systems and methods involve mission that are subject to uncertainty and change.

Therefore, it would be desirable to design an apparatus and method that provides a dynamic mission planning.

SUMMARY

According to some embodiments, a method and system is provided for receiving a set of formalized requirements for accomplishing a mission; allocating, by a processor using architecture synthesis and constraint solving techniques, a role to each of a plurality of assets comprising a team of autonomous entities, the team to execute specific tasks according to their role to accomplish the mission; and generating, by the processor using supervisory controller synthesis techniques, automata for accomplishing the mission for the plurality of assets, the automata being encoded to confer an ability to dynamically react to external inputs during a run-time execution of the automata by the plurality of assets A technical effect of some embodiments of the present disclosure is an efficient technique and system for encoding and generating mission plans, in some embodiments. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

BRIEF DESCRIPTION OF THE DRAWINGS

FIG. 3 is an illustrative depiction of a flow diagram of a process, according to some embodiments herein.

DETAILED DESCRIPTION

The following description is provided to enable any person in the art to make and use the described embodiments. Various modifications, however, will remain readily apparent to those in the art.

Figure 1:
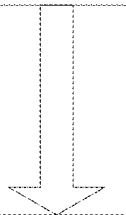
FIG. 1 is an illustrative logical overview of a process, according to some embodiments.

FIG. 1 is an illustrative logical overview of an information flow for a process and platform for performing mission planning and re-planning for a team or set of autonomous acting assets in situations of uncertainty, dynamicity, and other constraints, in accordance with some embodiments herein. In some embodiments, the assets may include unmanned autonomous vehicles (UAVs), including for example, aerial drones. Other autonomous or semi-autonomous assets including various configurations of unmanned vehicles and other machines and systems may be controlled or guided in missions applicable to some embodiments herein.

In some aspects, the manner in which plans for executing a mission are encoded and how those mission plans are generated are key aspects of the present disclosure. Herein, mission planning uses formal verification techniques to, for example, provide high assurance in the validity of the plans generated to execute a mission. As used herein, a mission refers to the objective(s) or goal(s) that are to be achieved by a set or team of UAVs or other assets. The term task as used herein generally refers to high-level actions for accomplishing a mission. The high-level tasks may be decomposed into sequences of smaller primitives that are referred to herein as plans or mission templates. A grouping or set of mission templates related to a task of a mission may, at least logically, be grouped together and referenced herein as a mission template catalog.

FIG. 1 illustrates a logical overview 100 of mission planning herein, including a decomposition function 105 and a synthesis function 110, according to some embodiments. At a high level decomposition function 105 and synthesis function 110 might generally include multiple different sub-steps or processes. For instance, the synthesis function may actually include iterations that include formal verification and refinement starting from canonical mission templates and finally arriving at mission plans that apply to conditions and objectives of a specific mission. Decomposition function 105 may include the processes of role allocation, task decomposition, and contract generation. As used herein, task decomposition refers to a process of deriving sequences of smaller primitives actions or mission templates from the high-level tasks of a mission. Role allocation herein refers to a process to assign roles of canonical mission templates representing a mission to specific members of a team of assets. In some aspects, the roles may be allocated to the team members based, at least in part, on their mission packages or resources. The contract generation function of decomposition function 105 captures the fact that collaboration amongst the different members of a team of UAVs or other assets will usually require at least some coordination between the team members. Herein, the term contract refers to obligation(s) team members have with each other and the coordination required to fulfill those obligations. For example, an Asset A may need to guarantee performing certain actions. Meanwhile, an Asset B can rely on the fact that Asset A will be performing the certain actions, in performing its own responsibilities and obligations. A contract herein may specify that Asset A will honor the contract by performing the particular action. In reliance on the contract, Asset B may operate with a level of assurance and certainty that the contract will be satisfied by Asset A's actions. Contracts herein can be used to represent and specify, in a formalized manner, the obligations assets have with each other. Breakage of a contract may be used as a trigger to switch mission templates in a high level automaton that encodes a mission template catalog.

Synthesis function 110 generally refers to process(es) to generate mission plans herein. The mission plans generated at operation 110 may be based on aspects of decomposition 105, including the role(s) of the assets responsible for completing a mission, the particular tasks each asset is to accomplish based on their role, and the obligations the assets owe to each other as specified in the contracts between them. In the instance of individual assets, and specifically in the aerial domain, mission plans may be seen as extensions of traditional flight plans. However, the mission plans herein may be dynamic in a sense that the plans react to inputs from the external world and actions or mission templates for the assets (e.g., UAVs) may usually include more than just flying maneuvers that define trajectories. That is, in some embodiments herein the mission plans are not static but instead are dynamic and multi-dimensional. For example, an asset in the aerial domain may further be tasked to perform the action of transmitting messages over a wireless network, where such an action may be triggered by an external world input such as an environmental change or an action by an adversary. These and other actions may be dynamically performed by UAVs and/or other types of assets.

In some embodiments, mission plans herein may be encoded as automata to facilitate mission plans that are, at least partially, dynamic. While a static mission plan may be fully captured and represented by static scripts, dynamic mission plans may not be feasibly or practically encoded as static scripts. Accordingly, the present disclosure encodes mission plans as automata (i.e., finite state machines) as opposed to an explicit set of instructions. Encoded as automata, mission plans herein may efficiently and appropriately react to inputs from the external world (i.e., dynamic circumstances) and accommodate varying scenarios. Automata representations also lend themselves well to formal analysis and algorithmic synthesis.

In some aspects, a team of assets may logically be viewed as a hierarchy of team members, where the mission plan for the overall team is represented as automata at a highest level of the team hierarchy. As referred to herein, high level plans for execution by multiple team members or assets may be referred to a "mission templates". In some instances multiple mission templates may be needed to accommodate the dynamic changes possible with a mission herein. As such, a collection of mission templates may be necessary to represent all of the mission templates representing a mission plan. The collection of mission templates is referred to herein as a "mission templates catalog". A mission template catalog may logically be viewed and referred to herein as an automaton whose states are individual mission templates.

In some embodiments herein, iteration over controller synthesis and formal verification techniques may be used to generate the automata during operation 110. In some embodiments, computers and systems having processors to execute process-executable instructions may be used to generate the automata, and by extension the automatons, herein.

Figure 2:
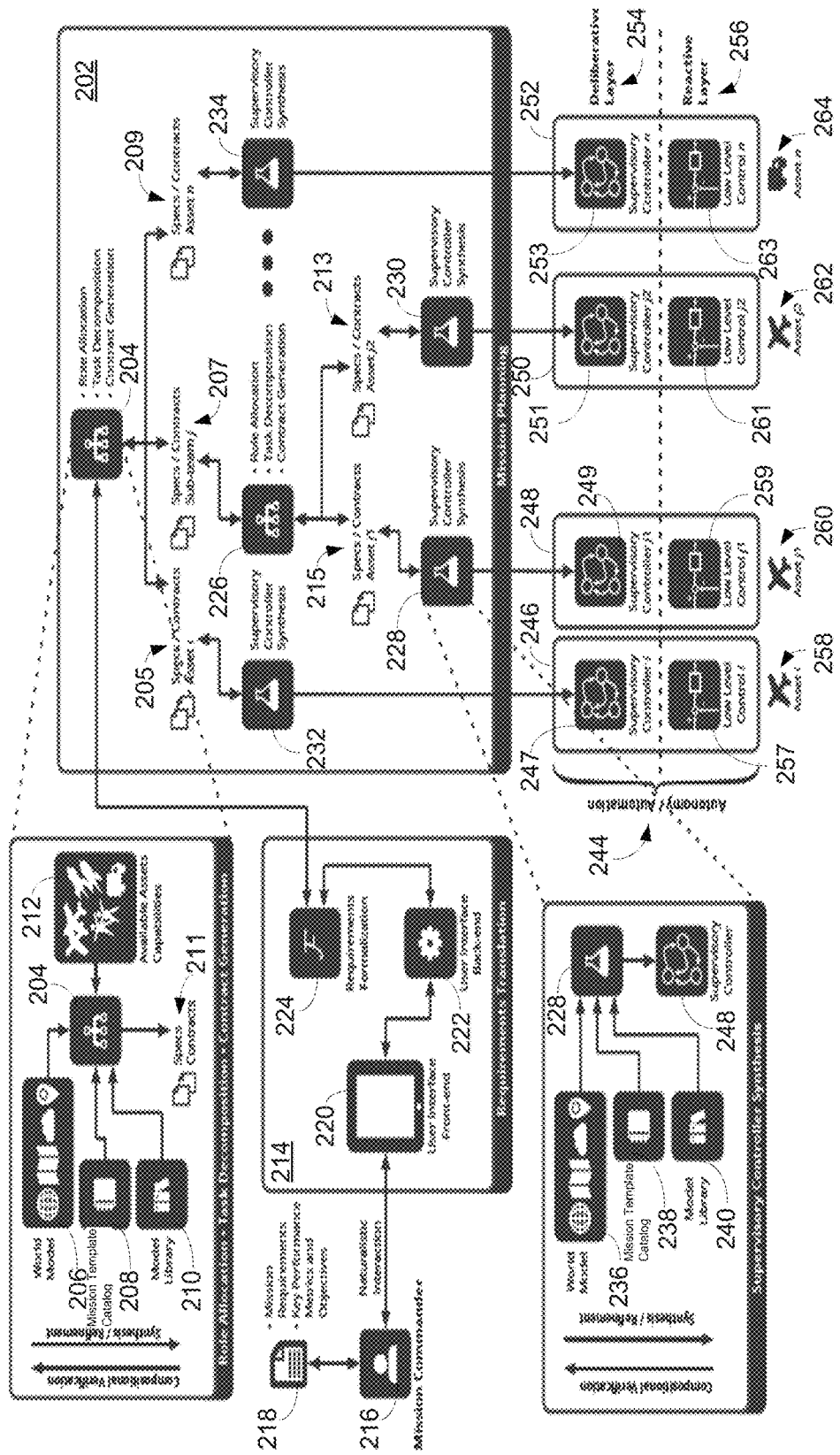
FIG. 2 is an illustrative depiction of a logical framework for mission planning, according to some embodiments herein.

FIG. 2 is an illustrative depiction of a framework or platform 200 for mission planning and re-planning, in accordance with some embodiments herein. Prior to a detailed discussion of FIG. 2, a few terms and concepts will be introduced that will be used in the detailed discussion of FIG. 2.

As used herein, a "world model" refers to a comprehensive set of current state information necessary for mission planning. Depending on a rank of an asset in a team hierarchy, the state information may be more comprehensive than the state information provided to other team members (i.e., assets). For example, team members at higher layers of the team hierarchy may use abstraction techniques to deal with large state information. In some embodiments, world model integrity requirements may be considered in a synthesis process herein (e.g., FIG. 1, 110). Such considerations may, for example, dictate that some assets may need to remain a certain distance from each other in order to guarantee the level of connectivity necessary for a message exchange necessary to maintain a consistent world model in all assets. Thus, the world view may be used in mission planning (e.g., FIG. 1, 105) and plan generation (e.g., FIG. 1, 110).

A "mission template catalog" further refers to a collection of high level canonical hierarchical automata used for defining mission scenarios. "Mission templates" further refer to valid execution sequences of low level action primitives. In a language analogy, mission templates may be analogous to sentences and mission template catalogs may be viewed as complete stories. "Contracts", as introduced above, may refer to coordination primitives including Assume-Rely pairs, where actions or conditions can be assumed by at least one asset and relied on by at least one other asset. A "supervisory controller" refers to an automaton that encodes a mission plan, considering all possible executions that depend on environment inputs. A "deliberative layer" herein refers to a planning or symbolic layer of an autonomy architecture that may logically be viewed as a form of control that deals with abstract/discrete information. A "reactive layer" herein refers to a lower control layer that deals with the continuous nature of the physical world.

Returning to FIG. 2, the logical representation of mission planning framework 200 may be implemented as processes and tools to execute the processes (e.g., devices, systems, modules, and executable computer software). The processes and tools may be used to generate "correct-by-construction" mission plans 246, 248, 250, 252 or deliberative layer 254 components for a team of cooperative autonomous systems 258, 260, 262, 264. Mission planning module 202 may include one or more decomposition modules 204 and 226. As explained in connection with FIG. 1, decomposition modules 204 and 226 may operate to perform role allocation, task decomposition, and contract generation processes.

As an example, a detailed view of decomposition module 204 is further reveled in FIG. 2, where inputs and outputs of the decomposition module are illustrated. As shown in the detailed depiction of decomposition module 204, inputs to the decomposition module may include a world model 206 that can include all of the information that may be needed for a team member asset to perform its role in accomplishing the mission. Some examples of information comprising the world model includes: internal state of all members of the team (position, state of execution, etc.). Mission template catalog 208 includes a set, collection, or plurality of mission templates, where the mission templates are each low level action primitives that may be executed by assets to effectuate their contribution to the mission. Mission templates herein may be predetermined operations and actions. However, given the dynamic nature of the problems and solutions herein, an execution of the mission templates may cause a switching between different mission templates as real world situations may indicate, wherein during a mission run-time assets herein may perform actions in a known and predictable manner even though the specific actions to be performed are not scripted (i.e., static). It is noted that the execution of a mission template may be dynamically triggered in response to an external input. Thus, a particular mission template may or may not be executed depending on other specific factors. In some aspects, mission template catalog 208 may be viewed as a collection of high level canonical automata that defines different mission scenarios. The mission template catalog represents the various states related to a mission.

A model library 210 may be used to provide one or more models and model components for modeling a mission. By using models or model components from model library 210, a mission may, at least in part, be modeled using components that are known to be effective and reliable. Model library 210 may include templates or generic models that may be modified, customized, or personalized to a particular mission. Further input to the composition module may include an indication or record of the available assets' capabilities 212 that may be called and relied upon to synthesize and execute a mission plan. The actual capabilities of the assets available to implement a mission plan may alter the mission templates that will be included in mission plan generated via framework 200.

Decomposition module 204 receives and processes the inputs 206, 208, 210, and 212 in an effort to generate specifications and contracts for the mission being planned. In some embodiments herein, the functions performed by decomposition module 204 may be executed using iterations over architecture synthesis and compositional verification techniques where each of the inputs and the output(s) of the decomposition module are verified as they are consumed and produced, respectively. The verification and generation (i.e., synthesis) function of the operations of decomposition module 204 may be performed iteratively to further refine the mission specifications and the contracts 211. In this process, compositional verification is used to determine whether candidate mission plans satisfy mission specifications considering resource constraints under all possible situations, including taking into account adversarial behavior that may be encoded in some models. Models of some adversary may encompass disturbances stemming from an environment, as well as actual adversarial behaviors, such as, for example, encountered in military applications.

Decomposition module 204 further receives or obtains additional information from a mission commander entity 216. Mission commander 216 may include a mission developer, administrator, or other person having knowledge of the mission's requirements, as well as key performance metrics and objectives 218. The mission commander's knowledge may be based, at least in part, their experience and problem-solving ability. The mission's requirements, key performance metrics, and objectives 218 may be provided to a requirements translation module 214 that formalizes the requirements for accomplishing the mission being planned by framework 200. In some instances, mission commander 216 can provide the mission's requirements, key performance metrics, and objections 218 to the requirements translation module 214 using natural language via a front-end user interface 220. In some embodiments, front-end user interface 220 may be able to receive and process natural language inputs presented in various formats, including spoken words, textual inputs, electronic file inputs, and inputs entered by the mission commander (or other user/entity) by manipulating graphical user interface elements on a user interface device or system (e.g., drag and drop representative icons via a touch screen or other user interface front-end 220). The data received via the user interface front-end 220 is sent to a user interface back-end including a requirements formalization engine 224. Requirements formalization engine 224 may use one or more algorithms to generate formalized representations of the predetermined requirements received from mission commander 216 as determined by the mission commander and/or other entities. The formal mission requirements determined at 224 may be formatted and configured in a manner such that the formalized requirements can be received and used by decomposition module 204.

In some aspects herein, the signaling necessary for coordination between assets for mission execution may be synthesized algorithmically. For example, the contracts may be derived during the mission decomposition and specification synthesis steps by decomposition module 204. An example contract herein may specify the interrelationship and obligations between, for example, two assets "A" and "B" where Asset A may require Asset B to execute a certain action. Asset A may then assume that Asset B will perform a certain action. Furthermore, Asset B may guarantee the execution of the specified action. This assume/guarantee pair may be referred to as a contract herein. If Asset B detects that it will be unable to fulfill the contract, then it can notify Asset A. Contracts herein may take the form of message exchanges that can occur periodically or are triggered in response to specific events. For example, when an Asset A does not receive a message from Asset B according to an established contract, Asset A may pass this information upward in a command hierarchy. In some embodiments, breaking or breaching a contract may trigger a switch or change in mission templates since the assumed conditions have changed.

Decomposition module 204 may operate to use the formal requirements generated by requirements translation module 214 and the roles it determines for the available assets to perform the different tasks comprising the mission given the requirements the assets owe each other as specified in the contracts to generate a hierarchy of mission plans for a team of autonomous (e.g., unmanned) assets. The specifications and contracts 211 determined by decomposition module 204 may be parsed and distributed to controllers 232 and 234, where these controllers are responsible for generating the portions of the mission plan that will be executed by individual team members 258 and 264. For example, a supervisory controller synthesis module 232 receives specifications/contracts 205 for mission template(s) to be executed by Asset i and supervisory controller synthesis module 234 receives specifications/contracts 209 regarding mission template(s) to be executed by Asset n. Each of the supervisory controller synthesis modules 232 and 234 proceed to generate an automaton 246 and 252, respectively, based on the specifications/contracts received that specifies the task(s) to be accomplished by the assets 258 and 264, including any contractual obligations.

In some instances, a mission template or group of mission templates determined by a decomposition model may be executed by a team or sub-set of team members as opposed to an individual team member. This is the case in FIG. 2 where specifications/contracts 207 are to be executed by a "sub-team" j of the hierarchy team of assets. A decomposition module 226 can further allocate the tasks of specifications/contracts 207 amongst the members (e.g., j1 and j2) or assets of sub-team j, in a process similar to that describing the functions of decomposition module 204. A supervisory controller synthesis module 228 receives specifications/contracts 215 for mission template(s) to be executed by Asset j1 and supervisory controller synthesis module 230 receives specifications/contracts 213 regarding mission template(s) to be executed by Asset j2. Each of the supervisory controller synthesis modules 228 and 230 proceeds to generate an automaton 248 and 250, respectively, based on the specifications/contracts they received that specify the task(s) to be accomplished by the assets 260 and 262, including any contractual obligations.

FIG. 2 further illustrates inputs and outputs for the supervisory controller synthesis modules therein. As shown, the supervisory controller synthesis modules (e.g., 228) use an iterative compositional verification technology process to generate a supervisory controller 248 based on the world model 236, mission template catalog 238, and model library 240. The supervisory controller synthesis module may be viewed as an automaton that encodes a mission plan for the specific assets 258, 260, 262, and 264. Supervisory controller synthesis modules 246, 250, and 252 are generated in a manner similar to supervisory controller synthesis module 248.

The generated or synthesized mission plans to be executed by the plurality of assets may be viewed as an autonomy architecture 244 that includes a deliberative layer 252 and a reactive layer. Deliberative layer 254 represents a planning or symbolic layer of the autonomy architecture, including supervisory controllers 247, 249, 251, and 253. The reactive layer 256 represents a low level layer of the autonomy architecture that interfaces with the physical world including the low level controls 257, 259, 261, and 263, which can trigger changes to the dynamic mission plans.

Referring to FIG. 3, a process 300 relating to mission planning is disclosed. Process 300 may be implemented by a system, framework, application, service, or apparatus configured to execute the operations of the disclosed process. In general, flow diagram 300 relates to a process to efficiently and robustly plan and re-plan missions for a team or set of autonomous assets.

In some embodiments, various hardware elements of an apparatus, device or system execute program instructions to perform process 300. In some embodiments, hard-wired circuitry may be used in place of, or in combination with, program instructions for implementation of processes according to some embodiments herein. Program instructions that can be executed by a system, device, or apparatus including a processor to implement process 300 (and portions and/or other processes disclosed herein) may be stored on or otherwise embodied as non-transitory, tangible media. Embodiments are therefore not limited to any specific combination of hardware and software.

Prior to operation 305, applications and services executing on a device or system in or on an asset, or a server-side computing device (e.g., an application server) of a cloud-based or web-based set of applications may be developed and deployed in an effort and/or anticipation to accommodate and implement at least portions of process 300.

At operation 305, a set of formalized requirements for accomplishing a mission may be received. Referring the framework of FIG. 2, the formalized requirements may be generated at the request of and under the control of a mission commander (e.g., 216) or other entity. As described earlier, the mission commander may be aware of the mission requirements and let performance metrics and objectives to the current mission being planned.

Operation 310 includes, at least in part, allocating a role to each of a plurality of assets comprising a team of autonomous entities that will be responsible for implementing and executing the mission. Referring to the framework 200 of FIG. 2, decomposition modules 204 and 226 may perform the allocating function of operation 310. In particular, the decomposition modules may receive the formal requirements of operation 305 and use architecture synthesis and compositional verification techniques to allocate roles to each of the assets.

Continuing with process 300, operation 315 includes generating automata for accomplishing the mission by the plurality of assets, where the automata is encoded to confer an ability to dynamically react to external inputs. Operation 315 may be understood by referring to FIG. 2, including supervisory controller synthesis modules, 232, 234, 228, 230 that receive specifications and contracts (e.g., 205, 209, 215, 213) and further operate to generate the automata 246, 248, 250, 252. It is noted that automata generated at operation 315 is done using compositional verification techniques that ensure, on a piece-wise level, that the particular automata generated thereby are correct by construction.

In some aspects, the automata generated at operation 315 may be used to control or direct the actions of the plurality of assets to actually execute a mission. Also, other additional operations and processes may executed in reliance on the products of process 300.

Figure 4:
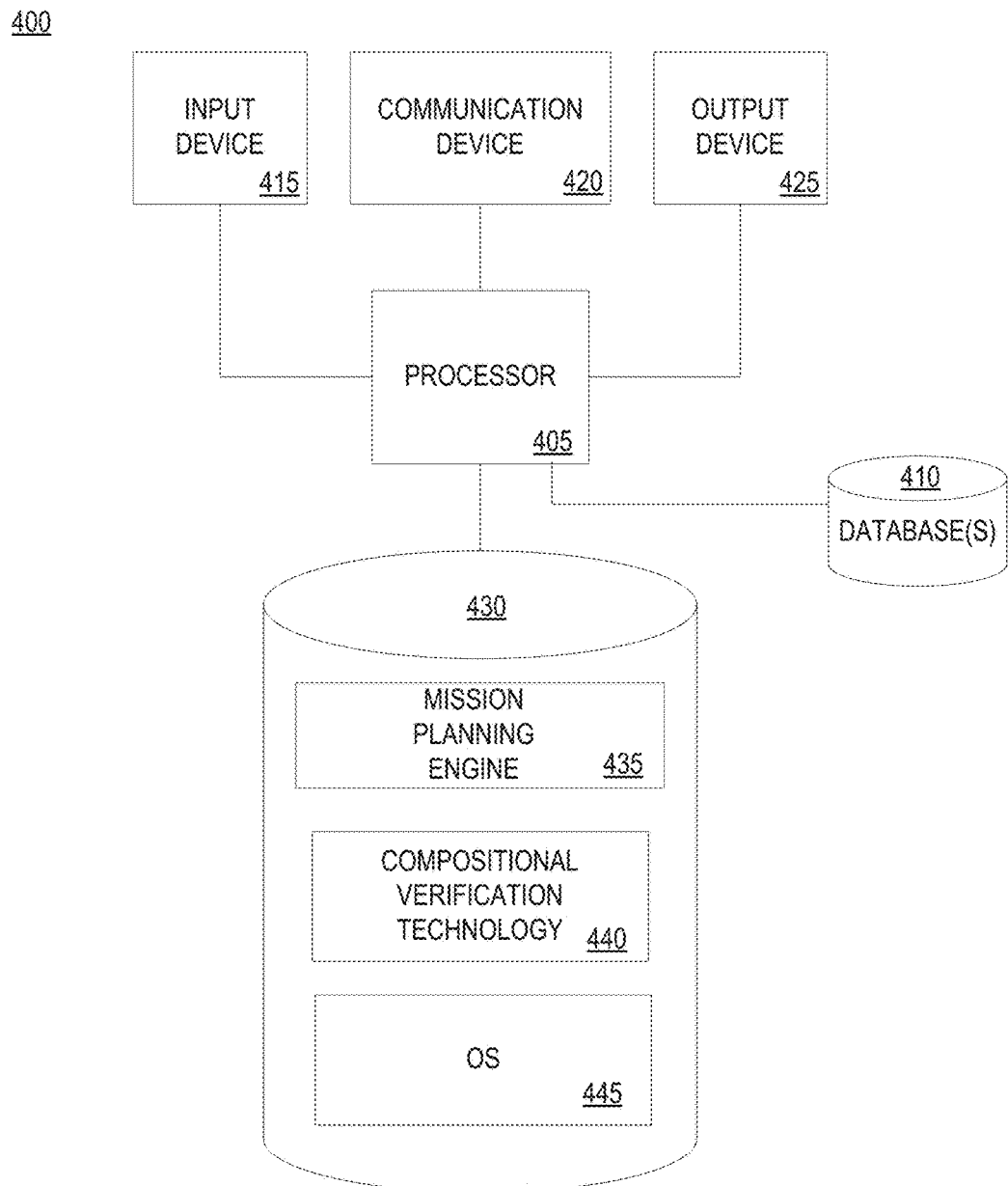
FIG. 4 is an illustrative block diagram of a system, according to some embodiments.

FIG. 4 is an illustrative depiction of a logical block diagram of a computing system or platform, in accordance with some embodiments. System 400 may be, for example, associated with devices for implementing the processes disclosed herein (e.g., platform or framework 200 and process 300). Being a logical representation or an abstraction of a device, system, or platform, an actual implementation of system 400 is not limited to the specific configuration depicted in FIG. 4 and may include fewer, additional, alternative, and substitute components, arranged in varying configurations. For example, one or more devices and systems to facilitate communication and/or processing may be disposed between two or more components of FIG. 4, without loss of any generality within the scope herein.

System 400 may be, for example, associated with devices for implementing the processes disclosed herein. System 400 comprises a processor 405, such as one or more commercially available Central Processing Units (CPUs) in the form of one-chip microprocessors or a multi-core processor, coupled to a communication device 420 configured to communicate via a communication network (not shown in FIG. 4) to another device or system (e.g., an administrator device or a client device, not shown). System 400 may also include a cache 410, such as RAM memory modules. The system may further include an input device 415 (e.g., a touchscreen, mouse and/or keyboard to enter content) and an output device 425 (e.g., a touchscreen, a computer monitor to display, a LCD display).

Processor 405 communicates with a storage device 430. Storage device 430 may comprise any appropriate information storage device, including combinations of magnetic storage devices (e.g., a hard disk drive), optical storage devices, solid state drives, and/or semiconductor memory devices. In some embodiments, storage device 430 may comprise a database system, including in some configurations an in-memory database.

Storage device 430 may store program code or instructions to control an operation of a computing device (e.g., system 400) to perform mission planning functions, in accordance with processes herein. Processor 405 may perform the instructions for implementing, for example, process 300 in accordance with any of the embodiments described herein. Storage device 430 may include data used by system 400, in some aspects, in performing one or more of the processes herein, including individual processes, individual operations of those processes, and combinations of the individual processes and the individual process operations.

Program instructions for configuring and encoding mission plans as disclosed herein, as well as generating automatons for executing mission plans by a plurality of assets including mission planning engine 435 and compositional verification technology 440 may be stored on storage device 430. Additionally, other program elements, such as an operating system, a database reporting system, and/or device drivers used by the processor 405 to interface with, for example, a mission commander, an administrator, and peripheral devices (not shown in FIG. 4) may be stored by storage device 430 at 445.

All systems and processes discussed herein may be embodied in program code stored on one or more tangible, non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

In some embodiments, aspects herein may be implemented by an application, device, or system to manage recovery of an entity or other application in a consistent manner across different devices, effectively across an entire domain.

Although embodiments have been described with respect to certain contexts, some embodiments may be associated with other types of devices, systems, and configurations, either in part or whole, without any loss of generality.

The embodiments described herein are solely for the purpose of illustration. Those in the art will recognize other embodiments which may be practiced with modifications and alterations. Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method implemented by a computing system in response to execution of program instructions by a processor of the computing system, the method comprising:
    receiving, by at least one decomposition module of a mission planning module, a set of formalized requirements generated by a requirements formalization engine for accomplishing a mission;
    allocating, by a processor of the decomposition module, using architecture synthesis, constraint solving, and compositional verification techniques, a role to each of a plurality of assets comprising a team of autonomous entities responsible to accomplish the mission, each of the plurality of assets of the team to execute specific tasks according to their allocated role to accomplish the mission;
    generating, by a processor of at least one supervisory controller synthesis module using controller synthesis and formal verification techniques, automatically and in response to the set of formalized requirements and the roles allocated to the plurality of assets, a mission plan for accomplishing the mission by the plurality of assets, the mission plan being generated to automatically and dynamically react to external inputs during a run-time execution of the mission plan by the plurality of assets to execute tasks according to their allocated role to accomplish the mission plan;
    sending the generated mission plan to the plurality of assets for the plurality of assets to, during a run-time execution of the mission plan, execute tasks in reaction to the external inputs and according to their allocated role to accomplish the mission;
    wherein the method further comprises generating a plurality of contracts between the plurality of assets, where the plurality of contracts represents obligations the plurality of assets has with each other and the coordination required to fulfill those obligations; and
    wherein the breaking or breaching of at least one contract among the plurality of contracts triggers a change in mission templates to be executed by the plurality of assets.

2. The method of claim 1, wherein the set of formalized requirements are generated based on at least one mission requirement, key performance metric, key performance objective, and combinations thereof for the mission.

3. The method of claim 1, further comprising:
    generating, by the at least one decomposition module, a hierarchy of mission plans for the team of autonomous entities, wherein the at least one decomposition module is responsible for generating portions of the mission plan corresponding to the hierarchy of mission plans that will be executed by each of the plurality of assets.

4. The method of claim 1, further comprising decomposing, by the at least one decomposition module, the mission into at least two sub-sets of tasks, where the sub-sets of tasks are to be accomplished by a sub-set of the plurality of assets.

5. The method of claim 1, further comprising deriving, by the at least one decomposition module, obligations specifying required dependencies between the plurality of assets that are relevant to the accomplishment of the mission, wherein the obligations are used in generating the mission plan to accomplish the mission.

6. The method of claim 1, wherein the plurality of assets switch between different mission templates according to changes in external inputs.

7. The method of claim 1, further comprising algorithmically generating, by the at least one supervisory controller synthesis module, automata comprising the mission plan for each of the plurality of assets, the automata specifying tasks to be executed by each of the plurality of assets to accomplish the mission.

8. The method of claim 7, further comprising the plurality of assets cooperating to execute the automata in a coordinated run-time.

9. A system comprising:
    at least one decomposition module of a mission planning module to:
        receive a set of formalized requirements generated by a requirements formalization engine for accomplishing a mission; and
        allocate, by a processor of the decomposition module, using architecture synthesis, constraint solving, and compositional verification techniques, a role to each of a plurality of assets comprising a team of autonomous entities to be responsible of accomplishing the mission, each of the plurality of assets of the team to execute specific tasks according to their allocated role to accomplish the mission; and
    at least one supervisory controller synthesis module to:
        automatically generate by a processor thereof using controller synthesis and formal verification techniques in response to the set of formalized requirements and the roles allocated to the plurality of assets, a mission plan for accomplishing the mission by the plurality of assets according to their allocated role to accomplish the mission plan, the mission plan being generated to automatically and dynamically react to external inputs during a run-time execution of the mission plan by the plurality of assets;

send the generated mission plan to the plurality of assets for the plurality of assets to, during a run-time execution of the mission plan, execute tasks in reaction to the external inputs and according to their allocated role to accomplish the mission;

wherein the decomposition module generates a plurality of contracts between the plurality of assets, where the plurality of contracts represents obligations the plurality of assets has with each other and the coordination required to fulfill those obligations; and wherein the breaking or breaching of at least one contract among the plurality of contracts triggers a change in mission templates to be executed by the plurality of assets.

10. The system of claim 9, wherein the set of formalized requirements are generated based on at least one mission requirement, key performance metric, key performance objective, and combinations thereof for the mission.

11. The system of claim 9, further comprising:
generating, by the at least one decomposition module, a hierarchy of mission plans for the team of autonomous entities, wherein the controller is responsible for generating portions of the mission plan corresponding to the hierarchy of mission plans that will be executed by each of the plurality of assets.

12. The system of claim 9, further comprising decomposing, by the at least one decomposition module, the mission into at least two sub-sets of tasks, where the sub-sets of tasks are to be accomplished by a sub-set of the plurality of assets.

13. The system of claim 9, further comprising deriving, by the at least one decomposition module, obligations specifying required dependencies between the plurality of assets that are relevant to the accomplishment of the mission, wherein the obligations are used in generating the mission plan to accomplish the mission.

14. The system of claim 9, further comprising generating, by the at least one supervisory controller synthesis module, automata comprising the mission plan for each of the plurality of assets, the automata specifying tasks to be executed by each of the plurality of assets to accomplish the mission.

15. The system of claim 14, further comprising the plurality of assets cooperating to execute the automata in a coordinated run-time.

16. The system of claim 14, further comprising the plurality of assets cooperating to execute the automata in a coordinated run-time.

17. A non-transitory, computer-readable medium storing instructions thereon, the medium comprising:
program instructions to receive, by at least one decomposition module of a mission planning module, a set of formalized requirements generated by a requirements formulization engine for accomplishing a mission;
program instructions to allocate, by a processor of the decomposition module, using architecture synthesis, constraint solving, and compositional verification techniques, a role to each of a plurality of assets comprising a team of autonomous entities to be responsible of accomplishing the mission, each of the plurality of assets of the team to execute specific tasks according to their role to accomplish the mission; and
program instructions to generate, by a processor of at least one supervisory controller synthesis module using controller synthesis and formal verification techniques automatically and in response to the set of formalized requirements and the roles allocated to the plurality of assets, a mission plan for accomplishing the mission by the plurality of assets, the mission plan being generated to automatically and dynamically react to external inputs during a run-time execution of the mission plan by the plurality of assets to execute tasks according to their role to accomplish the mission plan;
program instructions to send the generated mission plan to the plurality of assets for the plurality of assets to, during a run-time execution of the mission plan, execute tasks in reaction to the external inputs and according to their allocated role to accomplish the mission;
wherein the medium further comprises program instructions to generate a plurality of contracts between the plurality of assets, where the plurality of contracts represents obligations the plurality of assets has with each other and the coordination required to fulfill those obligations; and
wherein the breaking or breaching of at least one contract among the plurality of contracts triggers a change in mission templates to be executed by the plurality of assets.

18. The system of claim 17, wherein the set of formalized requirements are generated based on at least one mission requirement, key performance metric, key performance objective, and combinations thereof for the mission.

19. The system of claim 17, further comprising:
program instructions to generate, by the at least one decomposition module, a hierarchy of mission plans for the team of autonomous entities, wherein the at least one decomposition module is responsible for generating portions of the mission plan corresponding to the hierarchy of mission plans that will be executed by each of the plurality of assets.

20. The system of claim 17, further comprising decomposing, by the at least one decomposition module, the mission into at least two sub-sets of tasks, where the sub-sets of tasks are to be accomplished by a sub-set of the plurality of assets.

21. The system of claim 17, further comprising deriving, by the at least one decomposition module, obligations specifying required dependencies between the plurality of assets that are relevant to the accomplishment of the mission, wherein the obligations are used in generating the mission plan to accomplish the mission.

22. The system of claim 17, further comprising generating, by the at least one supervisory controller synthesis module, automata comprising the mission plan for each of the plurality of assets specifying tasks to be executed by each of the plurality of assets to accomplish the mission.

* * * * *